United States Patent [19]

d'Alayer de Costemore d'Arc

[11] Patent Number: 5,307,331
[45] Date of Patent: Apr. 26, 1994

[54] TRANSFER MECHANISM FOR INFORMATION CARRIERS

[75] Inventor: Stephane M. d'Alayer de Costemore d'Arc, Brussels, Belgium

[73] Assignee: Staar S.A., Brussels, Belgium

[21] Appl. No.: 940,361

[22] Filed: Sep. 3, 1992

[30] Foreign Application Priority Data

Oct. 23, 1991 [BE] Belgium ................. 91-00983

[51] Int. Cl.⁵ .................................. G11B 17/22
[52] U.S. Cl. ......................... 369/37; 360/98.04
[58] Field of Search ............... 369/36, 37; 360/98.06, 360/98.04

[56] References Cited

U.S. PATENT DOCUMENTS

| 2,340,418 | 2/1944 | Gabel | 369/192 |
|---|---|---|---|
| 2,935,325 | 5/1960 | Durant | 369/192 |
| 4,750,160 | 6/1988 | Miller | 369/37 |
| 4,791,626 | 12/1988 | Staar | 369/37 |
| 4,815,057 | 3/1989 | Miller et al. | 369/37 |
| 4,984,228 | 1/1991 | Agostini | 369/37 |
| 4,996,680 | 2/1991 | Staar | 369/37 |
| 5,136,562 | 4/1990 | Staar | 369/36 |
| 5,187,695 | 2/1993 | Schindler et al. | 369/37 |

FOREIGN PATENT DOCUMENTS

| 204480 | 9/1955 | Australia | 369/37 |
|---|---|---|---|
| 1161052 | 1/1964 | Fed. Rep. of Germany . | |
| 4121297 | 1/1992 | Fed. Rep. of Germany . | |
| 2404279 | 5/1979 | France | 365/37 |
| 0231761 | 12/1984 | Japan | 369/36 |
| 0038759 | 2/1985 | Japan | 369/36 |
| 2161013 | 1/1986 | United Kingdom . | |

Primary Examiner—Edward K. Look
Assistant Examiner—Hoang Nguyen
Attorney, Agent, or Firm—Leydig, Voit & Mayer

[57] ABSTRACT

A disc support and transfer mechanism for a disc changer including a magazine for supporting a plurality of discs in generally parallel vertical storage planes, and a disc transfer mechanism for transferring a selected disc from the magazine along a vertical transfer plane aligned with its vertical storage plane, the disc transfer mechanism including a longitudinally movable transfer bar extending over the magazine, the magazine and the frame being mounted for relative movement to position the transfer bar in an initial position above the selected disc resting in the magazine. First and second arms extend vertically down from the bar, the first arm being fixed to the transfer bar and the second arm being pivotably mounted to the transfer bar. The arms are located so that neither arm initially engages the disc. Upon movement of the transfer bar the first and second arms engage and roll the selected disc back and forth along a transfer plane to and from its storage plane; a first cam and a second cam pivot the second arm into and out of engagement with the selected disc responsive to movement of the transfer bar.

9 Claims, 6 Drawing Sheets

TRANSFER MECHANISM FOR INFORMATION CARRIERS

The present invention relates to transfer mechanisms for information carriers (discs, cassettes, etc.) and, more particularly, to mechanisms ensuring the transfer of information carriers such as optical discs, and especially those of the compact disc type, between a magazine in which they are contained in the stored position and the device which is to place them in the operative position for reproduction and/or recording of information.

BACKGROUND OF THE INVENTION

Optical discs are often contained in protective cartridges or boxes; however, the cost and bulk of changers for optical discs in cartridges or boxes is such that their use is limited to the professional field. To popularize the use of optical disc changers in the consumer market, it is essential to reduce their cost to the consumer, which means that the discs must be stored in the changer as they are, i.e. without individual protective cartridges.

Many mechanisms for transferring discs or cassettes have been proposed in the past, but these are either bulky or complex or lack the requisite precision, or need an additional mechanism to release the edge of the disc to allow the disc to rotate freely when it is in the operative position.

U.S. Pat. No. 4,750,160 discloses a transfer mechanism which grasps discs to guide their translation and utilizes a lateral movement of the disc into a wider housing provided in the transfer mechanism to allow the disc to rotate freely in the operative position. Such a system requires high precision for the various components, particularly those effecting the return of the disc into a narrow receptacle after playback.

Moreover, any flaw on the edge of the disc or rolling surfaces can set the disc askew and either damage its surface by contact with the walls or cause it to jam.

Finally, it is clear that this transfer system allows the discs to be maintained only approximately in the storage position since the two guiding and holding points have to be very close.

British published Application 2161013A discloses a transfer mechanism which utilizes a sliding transfer member having a pair of guide arms, the gap between the two arms being sufficient to allow the disc to turn freely in the operative position, thereby avoiding the need for a wider housing and lateral movement of the disc to the operative portion.

However, such a system provides only very imprecise guidance of the disc and can only be used with a magazine holding the discs approximately—the two holding points are also very close—and requires partition walls, which add to the cost of the magazine, which reduce the number of discs the unit can contain, and which can cause damage to the surfaces of a disc when the disc is being transferred. A similar system, having the same kind of drawbacks, is proposed in German publication DE-OS 1161052.

SUMMARY OF THE INVENTION

The requirements of high precision in operation, close tolerances and multiple elements raise manufacturing costs of existing transfer mechanism and tend to make them difficult and costly to service and maintain. Accordingly, the main object of the present invention is to overcome the aforesaid disadvantages by proposing a simple and low cost transfer mechanism which both ensures precise guidance of the disc during transfer and allows the disc to rotate freely in the operative position.

A further object of the invention is to provide a transfer mechanism which is more compact, so as not to increase the overall size of the changer.

Another object of the invention is to provide a transfer mechanism which allows the use of a disc-storage magazine which is of the simplest possible design so as to reduce its manufacturing cost, which very effectively holds the discs in place, and which allows the discs to be placed as closely as possible to one another so that the largest possible number of discs can be accommodated in a given volume.

A further object of the invention is to provide a transfer mechanism which avoids any contact between the faces of the disc and any wall surface either of the reproduction and/or recording unit or of the storage magazine.

To accomplish these objects, a disc support and transfer mechanism according to this invention includes a magazine for supporting a plurality of discs in generally parallel vertical storage planes, the disc support member having a plurality of generally parallel upwardly facing slots, each slot being slightly wider than disc thickness at its circumferential edge and contacting a disc solely on a bottom portion of its circumferential edge and within a narrow arcuate border portion so as to support the disc without contacting its opposite faces, and a disc transfer means for transferring a selected disc from the magazine into a playback device adjacent the magazine along a vertical transfer plane aligned with its vertical storage plane, the playback device and disc transfer means being carried by a frame mounted adjacent the magazine having a horizontal section extending over the magazine and a longitudinally movable transfer bar carried by the frame, the magazine and the frame being mounted for relative movement to position the horizontal section and the transfer bar in an initial position within the horizontal section above the selected disc resting in the magazine. The transfer bar has first and second arms extending vertically down from the bar, the first arm being fixed to the bar adjacent one end and being initially positioned spaced from the selected disc resting in the magazine at its circumferential edge, and the second arm being pivotably mounted to the bar spaced from the first arm when the bar is in its initial position by a distance greater than a diameter of the selected disc so that neither arm initially engages the disc. Motion producing means are provided on the frame for moving the transfer bar longitudinally from and to the initial position to move the first and second arms back and forth and thereby engage and roll the selected disc between the storage plane and the playback device along the transfer plane. First cam means are provided for pivoting the second arm into engagement with the selected disc resting in the magazine at its circumferential edge at about its horizontal center line upon responsive to longitudinal movement of the bar from the initial position, both arms having opposed V-shaped inner edges between which the selected disc resting in the magazine is trapped when the first fixed arm is moved into engagement and the second pivotable arm pivots into engagement with the selected disc edge as the bar moves longitudinally before the disc is rolled into the transfer plane. Continued longitudinal movement of the bar causes the selected disc to roll along the slot in the magazine while being trapped between the arms and to rise to a raised level as it moves into the transfer plane, the longitudinally movable bar having a cut-away portion with a V-shaped inner edge which receives and traps a top circumferential edge portion of the selected disc as it rolls in the transfer plane while being trapped between the arms. The disc is thereby held along three spaced portions of its circumferential edge throughout the transfer movement to ensure precise guidance.

Second cam means are provided for pivoting the second arm out of engagement with the selected disc responsive to continued longitudinal movement of the transfer bar which transfers the selected disc into the playback device, to free the selected disc for rotation. The selected disc is returned to the magazine by the same sequence of operations performed in the reverse sequence.

Other advantages, characteristics and features of the invention will emerge from the detailed description given here-below of a preferred embodiment of the invention applied to a disc changer for discs of the compact disc type, taken in conjunction with the drawings.

DESCRIPTION OF THE BEST MODE

Figure 1:
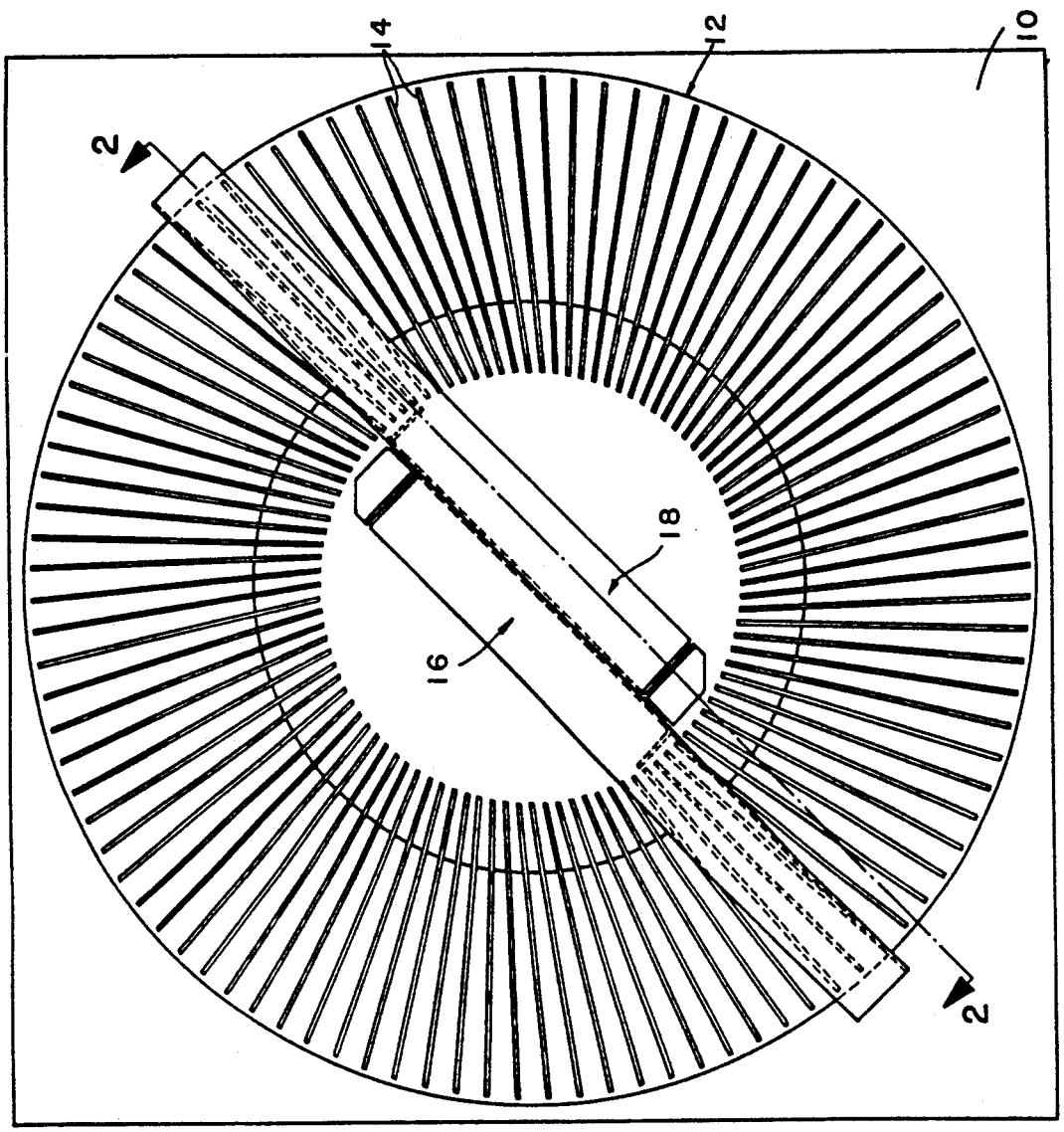
FIG. 1 is a top view of the disc changer apparatus.

Turning now to FIG. 1, a rotary type changer is shown comprising a base frame 10 and a rotatable annular magazine 12 for storing discs 14 and having an open central part in which dual playback devices 16, 18 are mounted. Referring also to FIGS. 2-5, the discs 14 are individually stored in the magazine 12 in vertical storage planes resting on their bottom edges in generally semi-circular pockets or slots 22 which clasp the rim of each disc 14 preferably over more than one third of its circumference and only within a narrow arcuate border portion so that the disc is firmly held in its storage position without contacting its opposite faces irrespective of movements imparted to the changer. In the particular changer illustrated, as disclosed in more detail in U.S. Pat. No. 4,984,228, the slots 22 in the magazine 12 in which the discs 14 are stored are all disposed (when viewed from the top as shown in FIG. 1) tangent to a circle concentric with the central axis of the magazine 12. The two individual playback devices 16, 18 are fixed in the center of the magazine 12 generally parallel to one another and are aligned with the slots 22 in the magazine 12 (due to the non-radial orientation of the slots 22) as the magazine is rotated so as to be in position to receive a selected disc transferred from any one of the slots 22 along a vertical transfer plane aligned with its vertical storage plane. It will be understood that the playback devices 16, 18 may be rotatably mounted on a support, as disclosed in the aforesaid patent, with a fixed magazine. For the present purposes, it is preferred to mount the playback devices 16, 18 on a fixed supporting plate, and rotatably mount the magazine to position the discs for transfer to the playback devices, or to receive discs in open slots after operation in the playback devices.

In carrying out the present invention, each of the two playback devices 16, 18 is provided with a disc transfer mechanism 20 for transferring discs 14 between the disc storage pockets or slots 22 in the annular magazine 12 and disc driving means of the individual playback devices 16, 18. Since the disc transfer mechanisms are identical, one of such transfer mechanisms 20 is shown in FIGS. 2–5 of the drawings and the following description will apply to the one illustrated, but it is to be understood that the same disc transfer mechanism 20 is provided for each of the two playback devices 16, 18. The disc transfer mechanism 20 of this invention is particularly, but not exclusively, adapted to transfer discs 14 in the dual playback mechanism rotary type changer illustrated which is disclosed in more detail in the aforesaid patent; the disc transfer mechanism 20 is not limited in application to this "dual" type of changer and is also applicable, for example, to conventional changers having a linear magazine and single playback devices. In all such changers the discs are stored in vertical generally parallel storage planes, it being recognized that the radially extending slots 22 in the magazine 12 are not exactly parallel but only "generally" parallel as shown.

Figure 5:
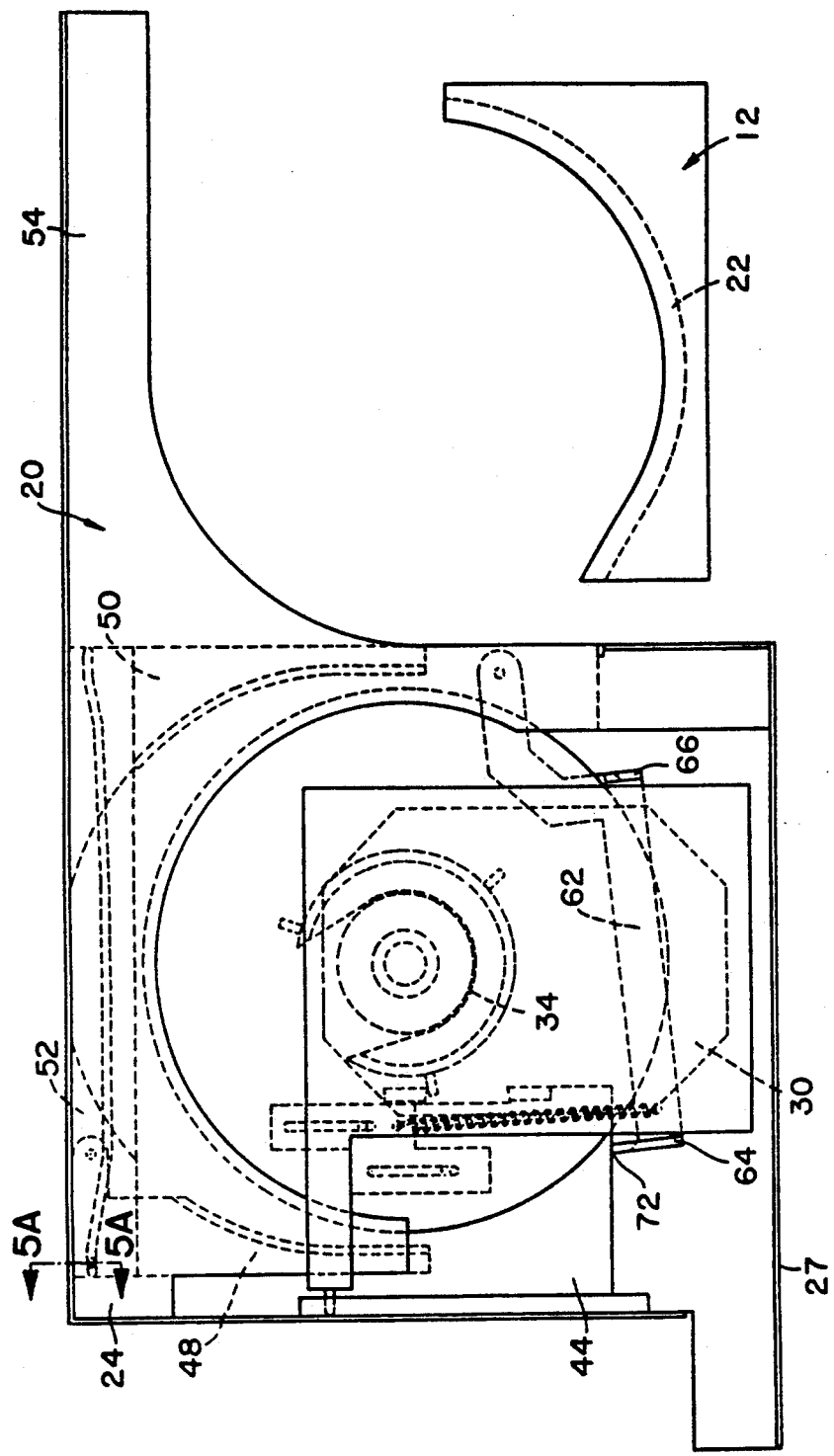
FIG. 5 is similar to FIG. 4 and shows the disc in its operative position.
Figure 5A:
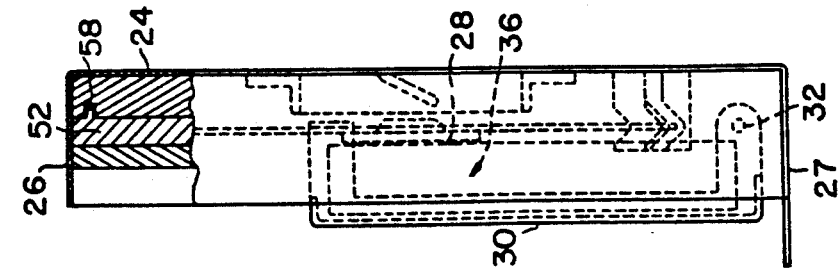
FIG. 5A is an end view taken from the right end of FIG. 5, with a fragmentary portion shown in section taken substantially along the section plane 5A—5A.

Referring again to FIGS. 2–5, each playback device 16 or 18 and its disc transfer mechanism 20 is supported by a frame 24 having a top edge 26. The bottom edge 27 of the frame 24 is attached to the base frame 10 of the changer unit. In keeping with the invention, to rotate a disc 14 for playback after transfer from the magazine 12, the playback devices 16, 18 include a disc driving means 28 (FIG. 2A) carried on a pivotable frame 30 which is mounted on a horizontal hinge 32 and pivots from a loading/unloading position (see FIGS. 2, 2A) into an operative position (FIGS. 5, 5A). The disc driving means 28 cooperates with a magnetic clamping means 34 (FIG. 2) movably mounted on the frame 24 to hold and retain a disc 14 in the operative position. For purposes of simplification of this description, the pivotable frame 30 is described hereinafter as having a disc driving means 28 carried thereby, however, it will be understood that it also has associated therewith playback and/or recording means, designated generally 36, and not shown in detail, which are effective as transducers to play back or record information on a disc 14.

Figures 2, 2A:
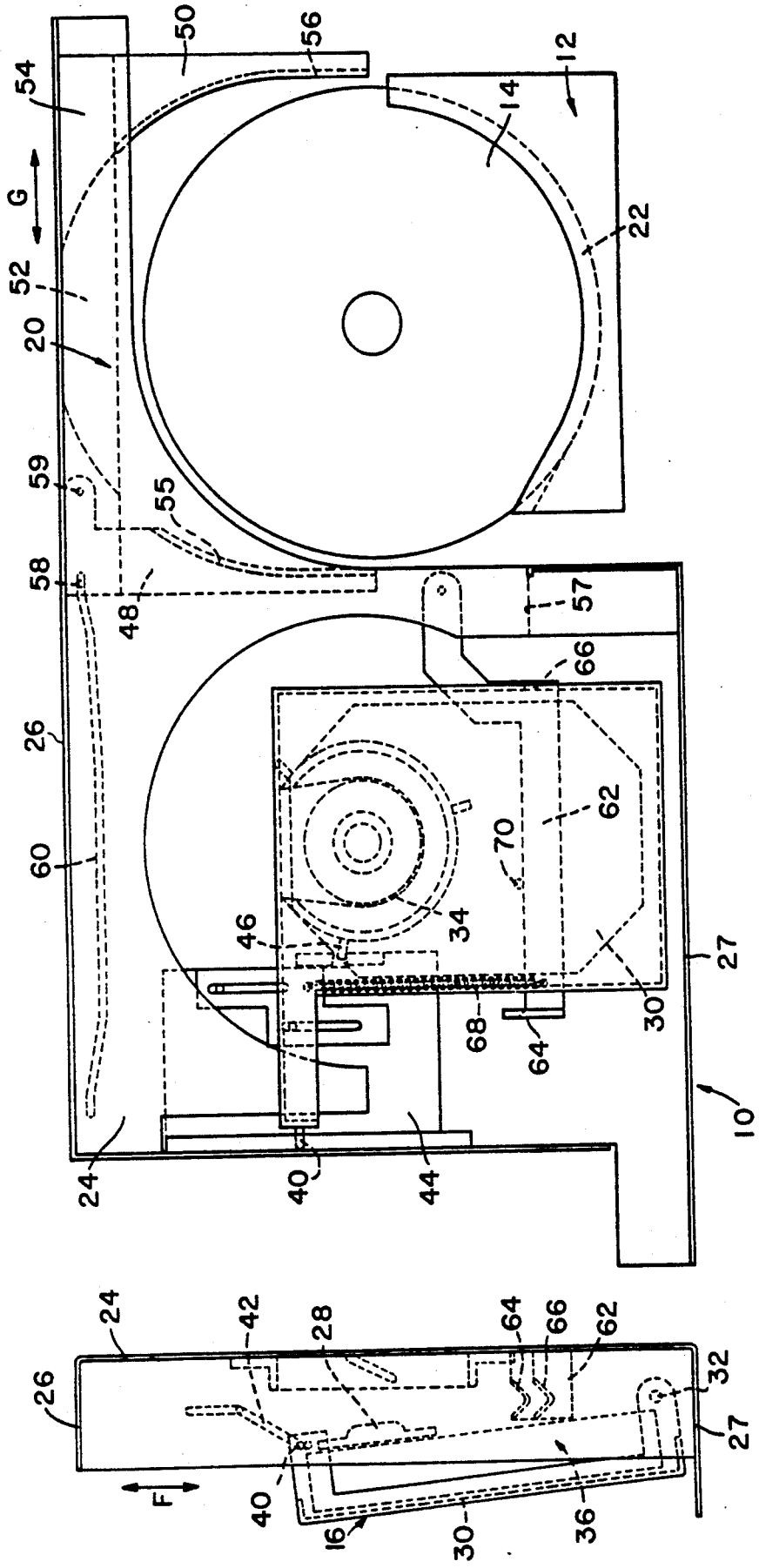
FIG. 2 is a front elevation view of the apparatus substantially along the plane 2—2 in FIG. 1, showing only the elements which are essential to an understanding of the invention.
FIG. 2A is an end view taken from the right end of FIG. 2 with parts omitted for clarity.

To move the pivotable frame 30 between the loading/unloading and operative positions of the disc driving means 28, one end of the frame 30 carries a stud 40 (FIG. 2) which engages in an angled slot 42 (FIG. 2A)

provided in a slide 44 guided by the frame 24 by means of a conventional stud-and-slot arrangement. This vertically movable slide 44 is moved via a rack (not shown) meshing with a gear driven by a motor (not shown) so that it is shifted in either vertical direction (double-headed arrow F—FIG. 2A) to move the pivotable frame 30 and the disc driving means 28 carried thereby between the operative position (FIGS. 5, 5A) and the loading/unloading position (FIGS. 2, 2A).

The magnetic clamping means 34 is also movable between an operative position and a loading/unloading position to allow a disc 14 to be transferred in the transfer plane to a loading/unloading position aligned with the disc driving means 28. The clamping means 34 is then moved into a position in which it cooperates with the disc driving means 28 to hold and retain a disc in the operative position. Movement of the magnetic clamping means 34 is also effected by the movement of the slide 44 by the action of the slide on a stud 46 (FIG. 2) carried by the clamping means 34.

Further in carrying out the invention, a selected disc 14 disposed in the magazine in a vertical position in one of the pockets or slots 22, is mechanically transferred edgewise by the transfer mechanism 20 out of the magazine 12 into one of the playback devices 16, 18 in the open center of the magazine in preparation for playback. The edgewise movement is accomplished by spaced arms 48, 50 which project downwardly from a longitudinally movable transfer bar 52 of the disc transfer mechanism 20 and clasp the disc 14 by its edge. By longitudinal movement of the transfer bar 52, with a disc 14 trapped between the arms 48, 50, a disc 14 is rolled on its bottom edge from its storage plane in a slot 22 in the magazine 12 into an aligned transfer plane and into the playback device 16 or 18 to a position adjacent and aligned with the pivotable frame 30 carrying the disc drive means 28 which is in the offset loading/unloading position as shown in FIG. 2A. When the frame 30 is pivoted toward the disc 14 to the operative position shown in FIG. 5A, the disc is clamped by the clamping means 34 to the disc driving means 28 and held in the operative positive. The disc 14 is returned to the magazine 12 by the same operations carried out in the reverse sequence.

Figure 6:
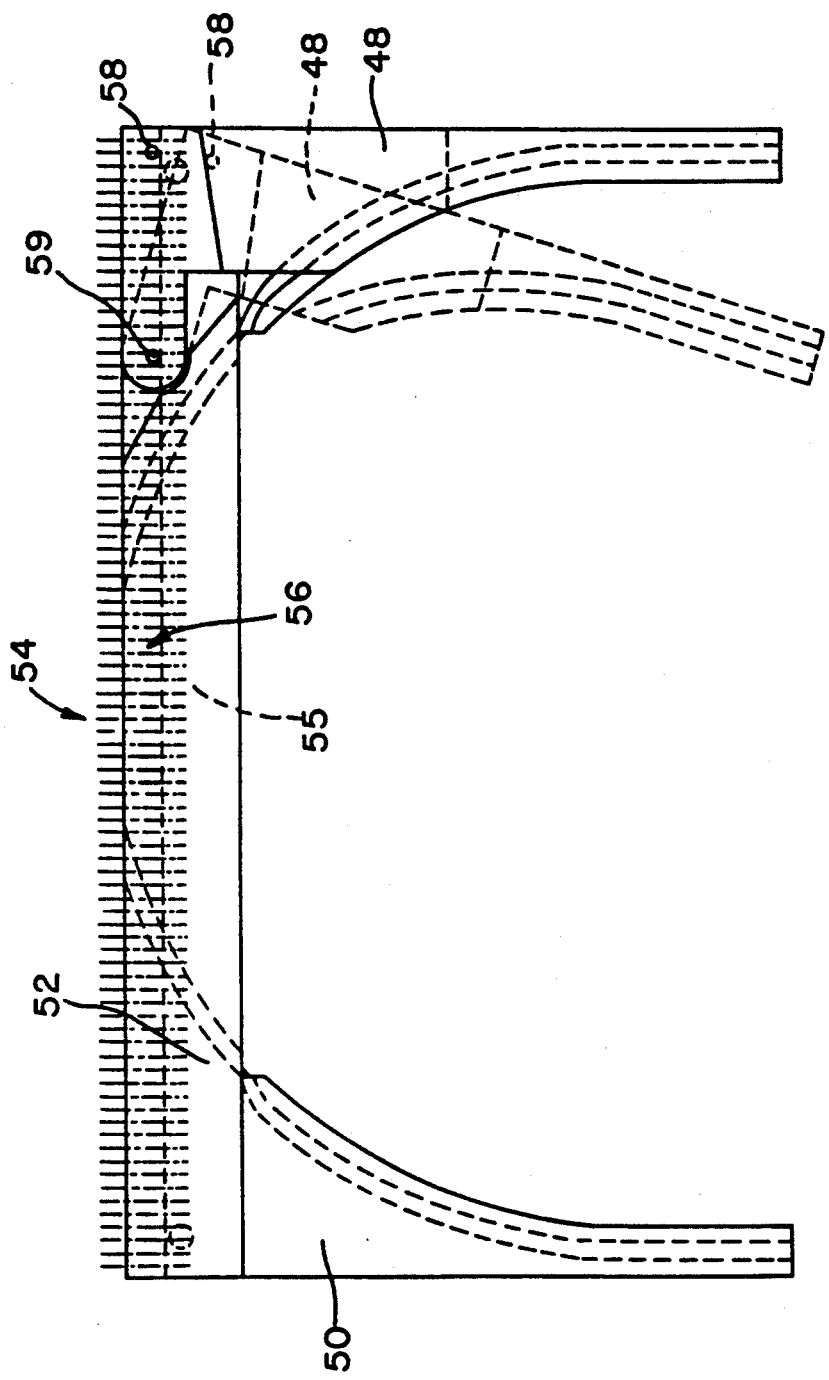
FIG. 6 shows the transfer bar and arms which appear in FIGS. 2 to 5, seen from the back of the apparatus.

To this end, as shown in FIG. 2, the transfer mechanism 20 is supported on the frame 24 and has a horizontally extending top transfer section 54 which projects above the magazine 12 and carries the longitudinally movable transfer bar 52 when it is an initial position. The transfer bar 52 has a cutaway intermediate portion 55 and a toothed rack 56 (diagramatically shown in FIG. 6) on its outer surface which meshes with a gear (not shown) driven by a motor (not shown), to shift the transfer bar 52 longitudinally as indicated by the double-headed arrow G in FIG. 2. Both arms 48, 50 which extend down from the transfer bar 52 have inside edges in the form of slots with a V-shaped profile to cooperate with the peripheral edge of the disc 14. The outer arm 50 is fixed to the transfer bar 52 while the innermost arm 48 is mounted so as to pivot about a pin 59 carried by the transfer bar 52. Thus, the transfer bar 52 comprises the horizontal portion of a transfer element having an "L" shape with the fixed arm 50 comprising the vertical portion, the transfer element also having the downwardly extending pivotable arm 48. Broken lines in FIG. 6 show the position occupied by the arm 48 when it is pivoted to hold a disc 14 by its peripheral edge and the solid line position of the arm 48 shows the position when it is pivoted away from the disc 14 to avoid interference with discs 14 in the magazine or in the operative position clamped to the disc driving means 28.

As shown in FIG. 2, the size and shape of the components of the transfer device 20 are such as to allow, when the discs are in the rest position in the magazine, freedom of relative movement between the magazine 12 and the transfer device 20 to ensure that the magazine 12 may be rotated to permit selection of a chosen disc 14.

Figure 3:
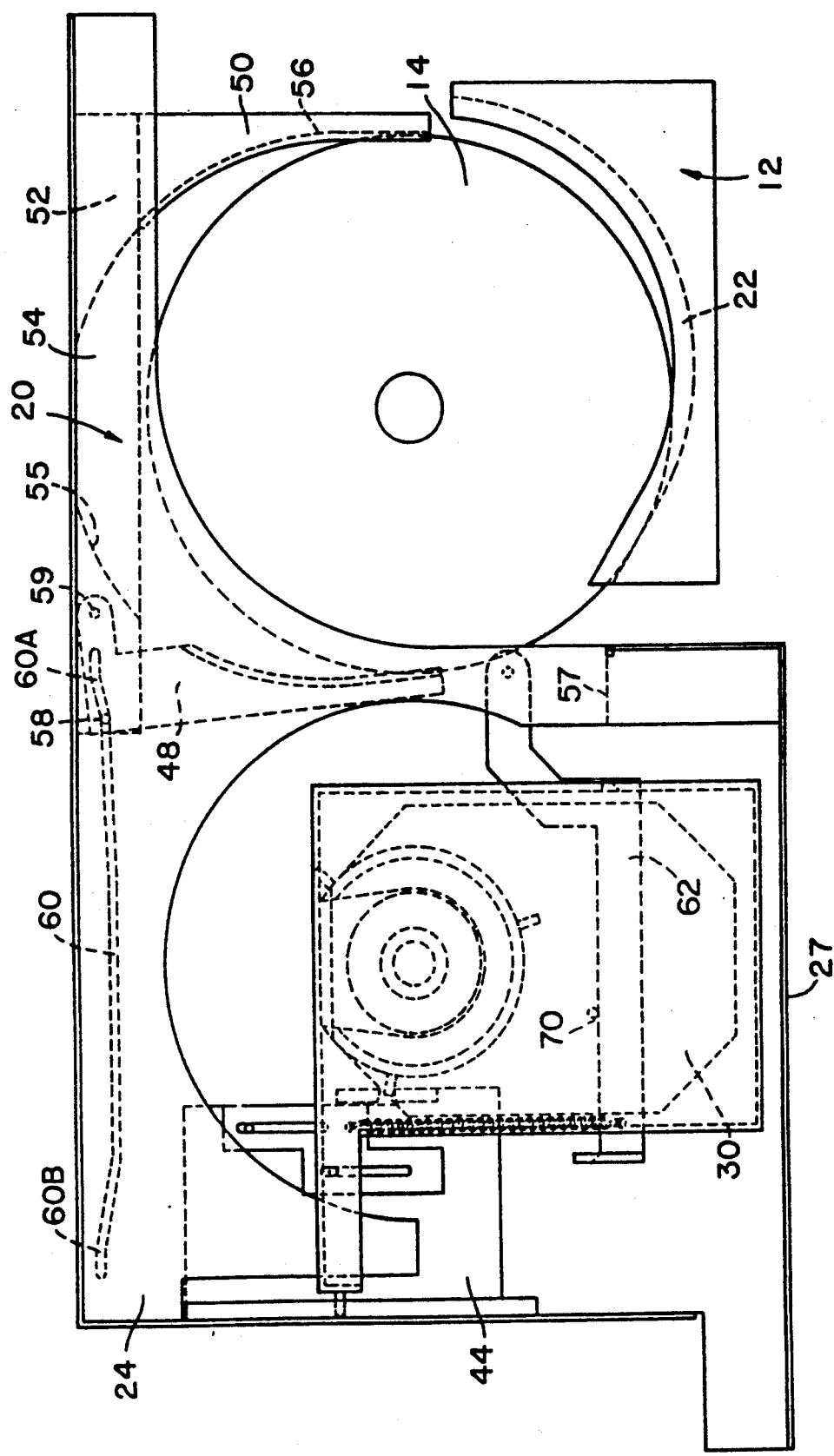
FIG. 3 is a front elevation view similar to FIG. 2, and shows a disc being rolled from its storage position into the transfer plane.
Figures 4, 4A, 4B:
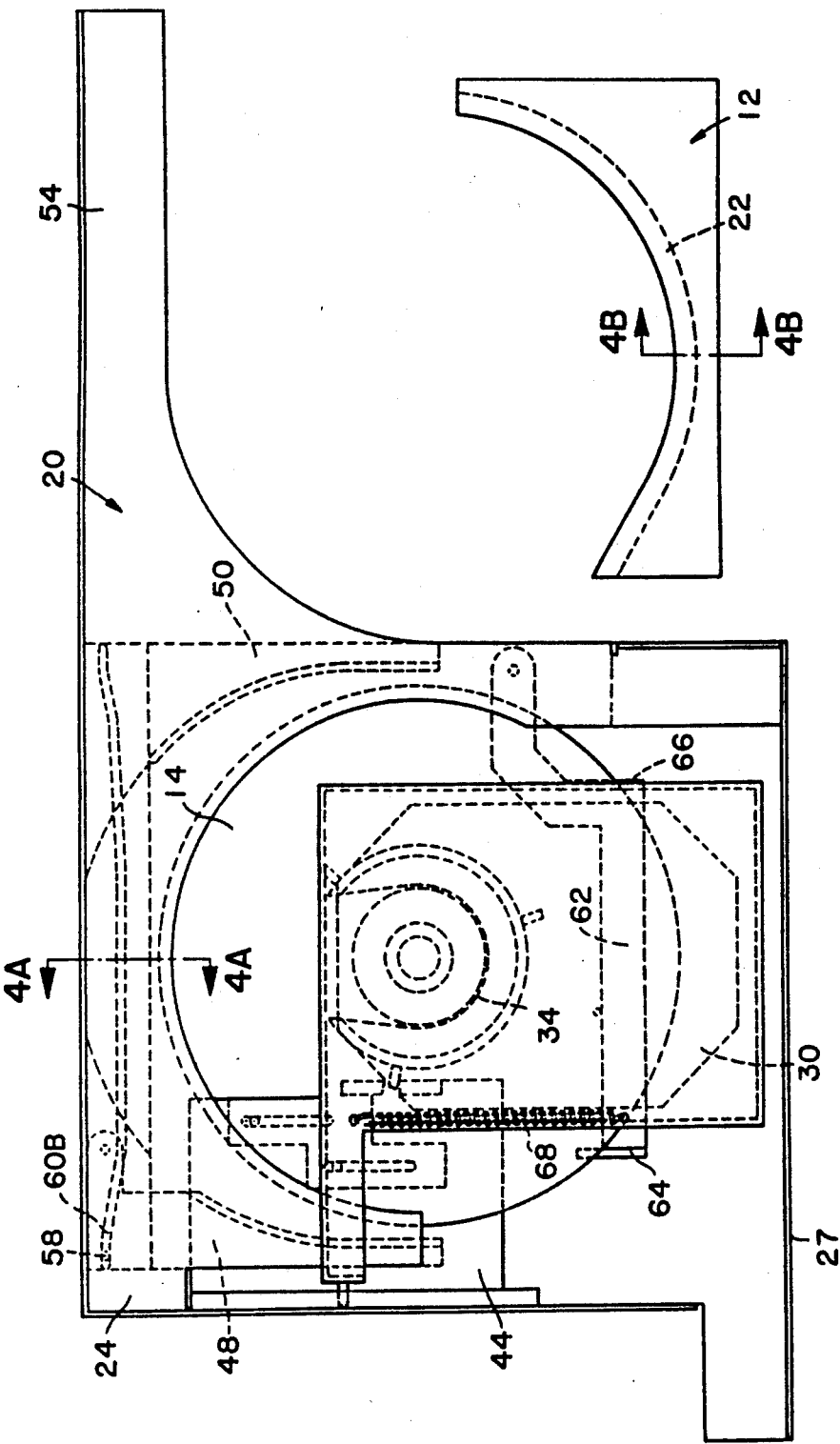
FIG. 4 is a front elevation view similar to FIGS. 2 and 3 and shows the disc positioned in front of its driving means.
FIG. 4A is a fragmentary sectional view substantially along the section plane 4A—4A in FIG. 4.
FIG. 4B is a fragmentary sectional view of the magazine taken substantially along the section plane 4B—4B in FIG. 4.

Now turning to FIG. 3, at the start of the inward translation movement of the transfer bar 52, in transferring a disc from a slot 22 in the magazine 12 to one of the playback devices 16, 18, the outer fixed arm 50 is moved inwardly toward the center of the magazine 12 from the position shown in FIG. 2, causing it to engage the outer edge of the disc 14 at about its horizontal center line. To cause the disc to be trapped between the two arms 48, 50, the pivotably mounted arm 48 is pivoted in a counter clockwise direction (as viewed in FIG. 3, clockwise as viewed from the back in FIG. 6) by interaction between a stud 58 which projects laterally from said arm 48 and a longitudinal cam slot 60 in a wall of the frame 24 which receives the stud 58 and has an inclined section 60A (FIG. 3) at the end of the cam slot 60 which cams the arm 48 toward the disc 14 when the transfer bar 52 is moved longitudinally inwardly toward the center of the magazine 12 via the gear and rack drive. The effect of the pivoting movement of the arm 48 is to trap the disc 14 between the opposed inner edges of the arms 48, 50 which are V-shaped. As the transfer bar 52 continues to move inwardly toward the center of the magazine and into one of the playback devices 16 or 18, the disc 14 is caused to roll on its bottom edge and follow the upward curve of the profile of the pocket or slot 22, causing the upper portion of the disc 14 to rise into the cutaway portion 55 of the transfer bar 52 above the disc 14 which also has a V-shaped slot on is inner edge, thereby engaging the disc at its opposite side edges and top edge and guiding the disc 14 during its rolling transfer into the playback device 16, 18. The disc 14 is rolled onto the transition section 57 of the frame 24 below the disc 14 which also has a V-shaped slot to guide the disc 14 as it rolls into the playback mechanism 16, 18. After the disc 14 is rolled over the transition section 57, it is moved further into the playback device 16, 18 and drops onto a support beneath the disc 14 provided by a lever 62 carrying two V-shaped lugs 64, 66 (see FIG. 4). The lever 62 is preferably biased in a clockwise direction by a spring 68, its travel being limited by a stud 70 fixed to the frame 24.

As the disc 14 approaches the end portion of the inward translatory movement produced by the transfer mechanism 20 (FIG. 4), the disc 14 is separated at its top edge from engagement with the transfer bar 52 and is engaged and guided at its opposite side edges by the arms 48, 50 and on its bottom edge by the lugs 64, 66. At the end of the inward movement cooperation between the stud 58 and the inner-most inclined end section 60B of the cam slot 60 causes the arm 48 to pivot in a clockwise direction (as viewed in FIG. 4), while the arm 58 is stopped at a position spaced from the edge of the disc 14 thereby completely freeing the arms 48, 50 from contact with the edge of the disc 14.

Substantially simultaneously with the freeing of the arms 48, 50 from the edges of the disc, the slide 44 is moved downwardly and causes (FIGS. 5, 5A): clamping of the disc 14 on its drive unit 28 by displacement of the magnetic clamping means 34; pivoting of the frame 30 about the hinge 32 and movement of the drive means 28 to the operative position; and downward pivoting of the lever 62 to lower the two lugs 64, 66 from contact with the bottom edge of the disc 14 via the stud 72.

The disc 14 is thereby totally freed from contact with the transfer mechanism 20 and can be rotated for playback and/or recording purposes.

Return of the disc 14 to a slot 22 in the magazine is effected very precisely by a reverse sequence of steps; that is, first the disc 14 is released from the disc driving means 28 and the clamping means 34 by upward shift of the slide 44 which causes movement of the magnetic clamping means 34 and the pivotable frame 30 and the driving means 28 carried thereby away from the disc 14; the upward shift of the slide 44 also allows the lever 62 to pivot due to the spring 68 and bring the lugs 64, 66 up to the bottom edge of the disc 14, supporting disc 14; substantially simultaneously, moving the transfer arm 52 outwardly to cause the disc 14 to be trapped between, the arms 48, 50; the movable arm 48 is pivoted counter-clockwise into engagement with the edge of the disc 14 by cooperation of the end 60B of the slot 60 and the pin 58.

The disc 14 is then rolled on its bottom edge from the lugs 64, 66 through the transition section 57 and into its semi-circular pocket-like slot 22 in the magazine 12, being guided by the cut away portion 55 and the inner edges of the arms 48, 50, which are V-shaped. At the end of the outward movement of the transfer mechanism 20, in particular the transfer bar 52, the outer arm 50 separates from the disc 14 and the inner arm 48 pivots clockwise (FIG. 2), completely freeing the edge of the disc 14 from the arms 48, 50. Relative movement between the magazine 12 and the playback devices 16, 18 can then proceed for the purpose of selecting another disc.

It should also be noted that due to the generally parallel arrangement of the playback devices 16, 18 and the non-radial arrangement of the slots 22 in the magazine 12, the relative movement for selection of discs can be effected while the transfer mechanisms 20 are in the position shown in FIG. 5, thus allowing selection of a disc for one of the playback devices 16, 18 while the other device is operating in playback or reproduction mode of another disc.

I claim:

1. A disc support and transfer mechanism for a disc changer comprising:
    a magazine having a plurality of generally parallel upwardly facing slots for supporting a plurality of discs in generally parallel vertical storage planes,
    a frame mounted adjacent the magazine and having a horizontal section extending over the magazine,
    disc transfer means carried by the frame including a transfer element having an "L" shape providing a vertical portion fixed to the transfer element to tangentially cooperate with the periphery of a disc, the transfer element being longitudinally movable along the horizontal section, the magazine and the frame being mounted for relative movement to position the horizontal section and transfer element in an initial position within the horizontal section above a selected disc resting in the magazine,
    a pivotable arm extending vertically down from the transfer element,
    said arm being pivotably mounted to the transfer element and being positioned spaced from the fixed vertical portion of the transfer element when it is in its initial position by a distance greater than the selected disc diameter, so that it does not initially engage the selected disc,
    motion producing means on the frame for moving the transfer element longitudinally from and to the initial position to move the fixed vertical portion and the arm back and forth and thereby engage and roll the selected disc between the storage plane and a playback device along an aligned transfer plane,
    first control means for pivoting the arm into engagement with the selected disc at its circumferential edge responsive to initial movement of the transfer element, both the fixed vertical portion and the pivotable arm having opposed inner edges between which the selected disc resting in the magazine is trapped at about its horizontal center line when the fixed vertical portion is moved into engagement and the pivotable arm pivots into engagement with the selected disc edge as the transfer element moves longitudinally before the disc is rolled into the transfer plane
    means for keeping said engagement during continued longitudinal movement of the transfer element by the motion means, and
    second control means for pivoting the arm out of engagement with the selected disc responsive to continued longitudinal movement of the transfer element by the motion producing means after the disc is close to the playback device, whereby the selected disc is freed for rotation,
    said first and second control means being elements mounted on the horizontal section of the frame and acting on the pivotable arm.

2. A disc support and transfer mechanism for a disc changer comprising:
    a magazine for supporting a plurality of discs in generally parallel vertical storage positions,
    a frame mounted adjacent the magazine,
    a disc transfer mechanism on the frame for transferring a selected disc between the magazine and a disc operating device,
    the disc transfer mechanism including a longitudinally movable transfer element having an "L" shape carried by the frame in an initial position extending over the magazine, the magazine and the frame being mounted for relative movement to position the transfer element above the selected disc resting in the magazine, the transfer element providing a vertical portion fixed to the transfer element to tangentially cooperate with the periphery of the selected disc,
    a pivotable arm extending vertically down from the transfer element,
    said arm being spaced from the fixed vertical portion of the transfer element when it is in its initial position by a distance greater than the selected disc diameter so that it does not initially engage the selected disc,
    a drive for moving the transfer element longitudinally in forward and return movements between the initial position above the magazine and a position adjacent the disc operating device such that when the arm and fixed vertical portion are in engagement with the selected disc it is rolled back and forth along a vertical transfer plane between its storage position and an operative position, first means including a first cam for pivoting the arm into engagement with the selected disc when it is in the magazine responsive to initial forward movement of the transfer element, initial forward movement of the transfer element also causing the fixed vertical portion to move into engagement with the selected disc, means for keeping the arm and fixed vertical portion in engagement with the disc during continued longitudinal movement of the transfer element by the drive, second means including a second cam for pivoting the arm out of engagement with the selected disc when it is close to the operative position responsive to continued longitudinal movement of the transfer element, continued longitudinal movement of the transfer element also causing the fixed vertical portion of the transfer element to be freed from engagement with the selected disk, whereby the selected disc is freed for rotation in the operative position, said second means also being operable for pivoting the arm into engagement with the selected disc when it is in the operative position responsive to initial return movement of the transfer element toward the magazine, said first means also being operable for pivoting the arm out of engagement with the selected disc responsive to return movement of the transfer element to its initial position after the selected disc has been rolled by the transfer element along the transfer plane and returned to its storage position in the magazine.

3. A disc support and transfer mechanism according to claim 1, wherein the pivotably mounted arm has a stud which by cooperating with a fixed element on the frame controls the relative pivotal movement of the arm with respect to the transfer element.

4. A disc support and transfer mechanism according to claim 3 wherein the fixed element on the frame is a slot.

5. A disc support and transfer mechanism according to claim 1 wherein the fixed portion of the "L" shaped transfer element and the pivotable arm have opposed V-shaped edges between which the selected disc is trapped as it is rolled back and forth.

6. A disc support and transfer mechanism according to claim 5 wherein means are provided beneath a selected disc for supporting the selected disc while it is being rolled along the transfer plane as it is trapped.

7. A disc support and transfer mechanism according to claim 1 wherein the transfer element has a portion providing means above a selected disc for engaging and guiding the selected disc while it is rolled along the transfer plane as it is trapped.

8. A disc support and transfer mechanism for a disc changer comprising:

a magazine for supporting a plurality of discs in generally parallel vertical storage planes, a frame mounted adjacent the magazine, a pair of playback devices carried by the frame, a disc transfer mechanism for each of the playback devices, each disc transfer mechanism comprising a transfer element including a longitudinally movable horizontal bar, the magazine and the frame being mounted for relative movement to position the horizontal bar in an initial position above a selected disc resting in the magazine, a pivotable arm extending vertically down from the bar, a vertical portion fixed to the horizontal bar adjacent one end remote from the playback devices and being initially positioned spaced from the selected disc resting in the magazine adjacent its circumferential edge near a point in line horizontally with the center of the disc, an arm pivotably mounted to the horizontal bar spaced from the fixed vertical portion when the bar is in its initial position by a distance greater than a diameter of the selected disc so that neither the arm nor the fixed vertical portion initially engages the selected disc and the selected disc is therebetween, motion producing means on the frame for moving the horizontal bar on the frame longitudinally from and to the initial position to move the fixed vertical portion and the arm back and forth and thereby engage and roll the selected disc along the transfer plane between the magazine and a respective disc playback device, first cam means for pivoting the arm into engagement with the selected disc resting in the magazine at its circumferential edge near a point horizontally in line with the center of the disc responsive to longitudinal movement of the horizontal bar toward the playback device from the initial position, means operable upon continued movement of the horizontal bar toward the playback device for causing the selected disc to roll from the magazine while being trapped between the fixed vertical portion and the arm and to rise to a raised level as it moves into the transfer plane, the horizontal bar having a cutaway portion which receives and traps a top circumferential edge portion of the selected disc as it rolls at the raised level in the transfer plane toward the playback device while being trapped, transition support means on the frame beneath the selected disc for supporting the selected disc at the raised level in the transfer plane as it rolls between the magazine and playback device upon final longitudinal movement of the horizontal bar, second cam means for moving the playback device and selected disc relatively and for clamping the selected disc to a disc drive means, the first and second cam means including means for pivoting the arm and for shifting the final support means out of engagement with the selected disc as it is clamped to the disc drive means, to free the disc for rotation.

9. A disc support and transfer mechanism for a disc changer comprising:

a magazine including a disc support member for supporting a plurality of discs in generally parallel vertical storage planes, a disc transfer mechanism for transferring a selected disc from the magazine and to return it to the magazine along a vertical transfer plane aligned with a vertical storage plane, a frame mounted adjacent the magazine and supporting the disc transfer mechanism, said frame including a horizontal section extending over the magazine, a longitudinally movable "L" shaped transfer element carried by the frame, the transfer element including a horizontal bar and a fixed arm extending vertically downwardly from the horizontal bar, the magazine and the frame being mounted for relative movement to position the horizontal section above the selected disc in the magazine, the longitudinally movable transfer element having an initial position with the horizontal bar within the horizontal section above the selected disc, the vertical fixed arm of the transfer element being initially located spaced from the selected disc in the magazine adjacent its circumferential edge at about its horizontal center line, a vertical movable arm movably mounted to the horizontal bar of the transfer element spaced from the fixed arm when the transfer element is in its initial position by a distance greater than a diameter of the selected disc so that neither the movable arm nor the fixed arm initially engages the disc and the selected disc is therebetween, motion producing means on the frame for moving the transfer element longitudinally from and to the initial position such that when the fixed and movable arms are in engagement with the selected disc it is rolled back and forth along the transfer plane between the magazine and a disc operating device, first control means for moving the movable arm toward the fixed arm and into engagement with the selected disc resting in the magazine at its circumferential edge at about its center line responsive to longitudinal movement of the transfer element toward the disc operating device from the initial position, to trap the selected disc between the fixed and movable arms, means operable upon continued movement of the transfer element for maintaining the selected disc trapped between the fixed and movable arms and for causing the selected disc to roll along the transfer plane to the disc operating device while being trapped, and second control means for moving the movable arm away from the fixed arm and out of engagement with the selected disc, and for disengaging the fixed arm from the selected disc, responsive to continued longitudinal movement of the transfer element after the selected disc is close to the disc operating device, to free the selected disc for operation by the disc operating device, said second control means also being operable for moving the movable arm into engagement with the selected disc when it is in the disc operating device responsive to initial return movement of the transfer element to trap the disc for return movement to the magazine, said first control means also being operable for moving the movable arm out of engagement with a disc when it has been returned to the magazine to free the returned disc, responsive to return of the transfer element to the initial position, said first and second control means including elements mounted on the horizontal section of the frame and acting on the moveable arm.

* * * * *